United States Patent [19]

Huno et al.

[11] 4,346,439
[45] Aug. 24, 1982

[54] DIRECT MEMORY ACCESS OF A MAIN MEMORY BY AN INPUT/OUTPUT DEVICE USING A TABLE IN MAIN MEMORY

[75] Inventors: Takakazu Huno, Tachikawa; Takeyuki Endo; Kunihiro Odaka, both of Hinode; Yasutaka Shibuya, Tachikawa, all of Japan

[73] Assignees: Hitachi, Ltd.; Hitachi Denshi Kabushiki Kaisha, both of Tokyo, Japan

[21] Appl. No.: 109,878

[22] Filed: Jan. 7, 1980

[30] Foreign Application Priority Data

Jan. 17, 1979 [JP] Japan .................................. 54-2969

[51] Int. Cl.³ .............................................. G06F 3/00
[52] U.S. Cl. .................................................. 364/200
[58] Field of Search ... 364/200 MS File, 900 MS File

[56] References Cited

U.S. PATENT DOCUMENTS 4,245,300  1/1981  Kaufman et al. .................. 364/200

*Primary Examiner*—Raulfe B. Zache
*Attorney, Agent, or Firm*—Craig and Antonelli

[57] ABSTRACT

A data transfer system for use in a data processing system using a direct memory access mode of operation, which is equipped with a processor, a main memory and an input/output device. The data transfer system is characterized in that, when a group of data to be transferred exists in a plurality of areas of continuous addresses of the afore-mentioned memory, a table is provided in the afore-mentioned main memory with identifying information for each group of data indicative of the first address and the number of data items to be transferred from each area of continuous addresses. Only the first address and the number of data items are fed out of the processor to the input/output device by the program control; and in the input/output device, the content of the corresponding table is transferred from the main memory in accordance with the data fed out of the processor so that the direct data transfer may be effected between the main memory and the input/output device in accordance with the transferred table content.

15 Claims, 19 Drawing Figures

DIRECT MEMORY ACCESS OF A MAIN MEMORY BY AN INPUT/OUTPUT DEVICE USING A TABLE IN MAIN MEMORY

BACKGROUND OF THE INVENTION

1. Field of the Invention

The present invention relates to a data transfer method and device in a data processing system using a Direct Memory Access Mode (referred to herein as "DMA").

2. Description of the Prior Art

As shown in FIG. 1, a computer system is known which comprises a processor 1, a main memory 2, an interface circuit 3, an input/output controller 4 and an input/output device 5 with data transfer between these elements being effected through a data bus 6. The DMA system, in which data transfer is performed directly between the main memory 2 and the input/output device 5, has been conceived as the input/output control system for such computer system, in addition to a program control system resorting to the program of the processor 1.

Such a system is described, for example, in "Microcomputer Handbook Series: Digital Memories and Peripherals", PP2-193-PP2-215 (published by Digital Equipment Corporation).

According to that DMA system, block transfer of data is performed to the area of continuous addresses of the main memory 2, such as a core memory, so that the data transfer can be effected at high speed. Prior to execution of the DMA mode, therefore, the first address of the area of transferred data and the amount of data to be transferred from the main memory 2 must be fed to the interface circuit 3 by the program control of the processor.

Here, in case an image displaying device for displaying various images is used as the input/output device, the data displayed in the displaying device is seldom obtained from one area of continuous addresses in the main memory 2, but is generally obtained from a plurality of different areas of continuous addresses, which areas are scattered in the main memory 2.

In case the data thus scattered in the main memory is to be transferred, the prior art has a drawback in that, since, prior to initiation of the DMA mode of each address area, the first address of that address area and the amount of data to be transferred must be fed to the interface circuit at a low speed by the program control, and the time required for transferring the first address and the amount of the transferred data becomes greater as the number of address areas scattered in the main memory is increased, with a result that the time for displaying the data is accordingly elongated. On the other hand, even in the case where the data is displayed within a short time, there arises another drawback in that the amount of data to be displayed is accordingly restricted.

SUMMARY OF THE INVENTION

It is therefore an object of the present invention to provide a data transfer method and device for remarkably reducing the time for data transfer between a main memory and an input/output device according to the DMA system and for remarkably increasing the data transfer rate in general within the system.

In order to attain the above object, the data transfer method according to the present invention is characterized by the fact that, when the data to be transferred is found in plural areas of continuous addresses in the main memory, the table indicative of the first address and the number of transferred data lines in the area of each address is provided in the main memory so that only the first address and the data line number of the table are fed to the input/output device by the program control, and so that the corresponding content of the table is transferred at a high speed to the input/output device by the DMA system in accordance with the information from the processor thereby to automatically effect DMA transfer of the data from the main memory to the input/output device in accordance with the table transferred.

DESCRIPTION OF THE PREFERRED EMBODIMENTS

Figure 1:
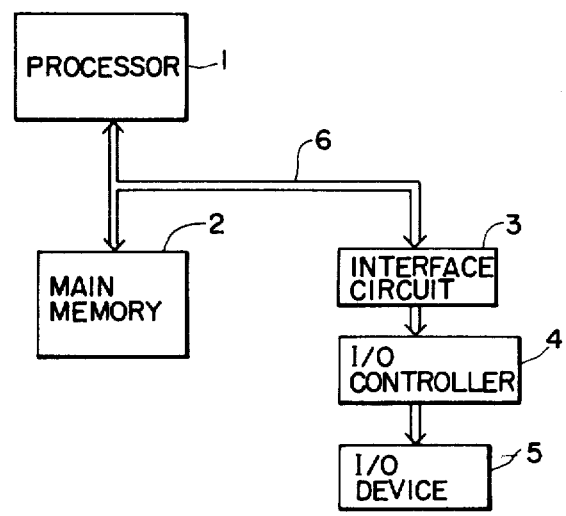
FIG. 1 is a block diagram showing one example of a computer system to which the present invention may be applied.
Figure 2:
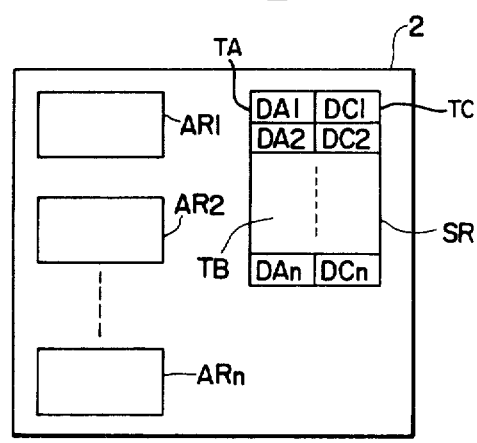
FIG. 2 is a diagrammatic view showing the construction of one example of a main memory to be used in a data transfer system according to the present invention.

FIG. 2 shows the construction of one example of a main memory to be used in a data transfer system according to the present invention. In the case where the data to be transferred and displayed is stored in a plurality of separate areas of continuous addresses AR1, AR2, - - -, ARn in the main memory 2, the first or starting addresses of the respective areas are indicated at DA1, DA2, - - -, DAn, and the amount of transferred data (number of lines) provided in each of the respective areas is indicated at DC1, DC2, - - -, DCn. Those first addresses DA1, DA2, - - -, DAn and the amounts of transferred data DC1, DC2, - - -, DCn are grouped to make up a table TB, which is written in an area of continuous addresses SR of the main memory 2. In this regard, it is assumed that the data is to be transferred in block units.

If the first or starting address and the number of data blocks of separate address areas, in which that table TB is written, are indicated by TA and TC, respectively, prior to initiation of the DMA mode, the first address TA and the number of blocks of data TC of a preset address area SR for the table are read out to the processor 1 by the program control of the processor 1 so that they are fed out to the interface circuit 3 through the data bus 6. In the interface circuit 3, on the basis of the first address TA and the number of blocks of data TC fed out of the processor 1, the content of the table TB stored in a preset corresponding address area SR is taken by the DMA transfer. After that, the data of the address areas AR1, AR2, - - -, ARn, which are designated with reference to that table, are automatically transferred in the DMA mode.

It is needless to say that a separate preset address area SR to store the table is designated for each of the data groups to be transferred and displayed. Thus, in the data transfer system according to the present invention, only the first address and the number of blocks of data of the table indicative of a plurality of areas of continuous addresses are fed from the processor 1 to the interface circuit 3 at the side of the input/output device by the program control, then high speed DMA transfer is automatically effected in the interface circuit 3. As a result, the time required for the data transfer can be shortened, and the time for the processor 1 to be exclusively occupied for the data transfer is also shortened. If, moreover, the time to be exclusively occupied for the data transfer is unchanged, the quantity of data to be transferred is accordingly so increased that the processing of the data can be accomplished remarkably efficiently.

Figure 3:
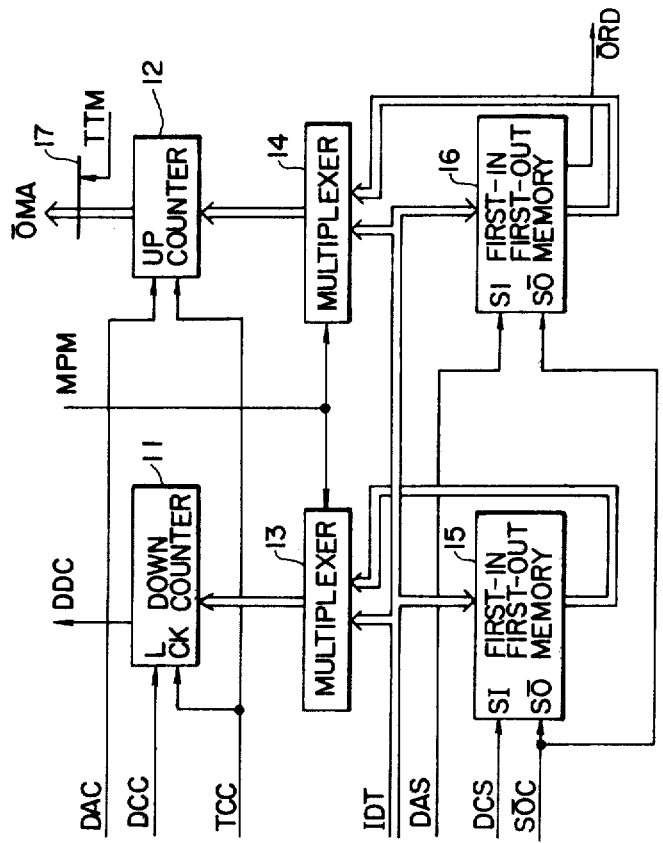
FIGS. 3 and 4 are block diagrams showing one embodiment of an interface circuit to be used in the data transfer system according to the present invention.
Figure 4:
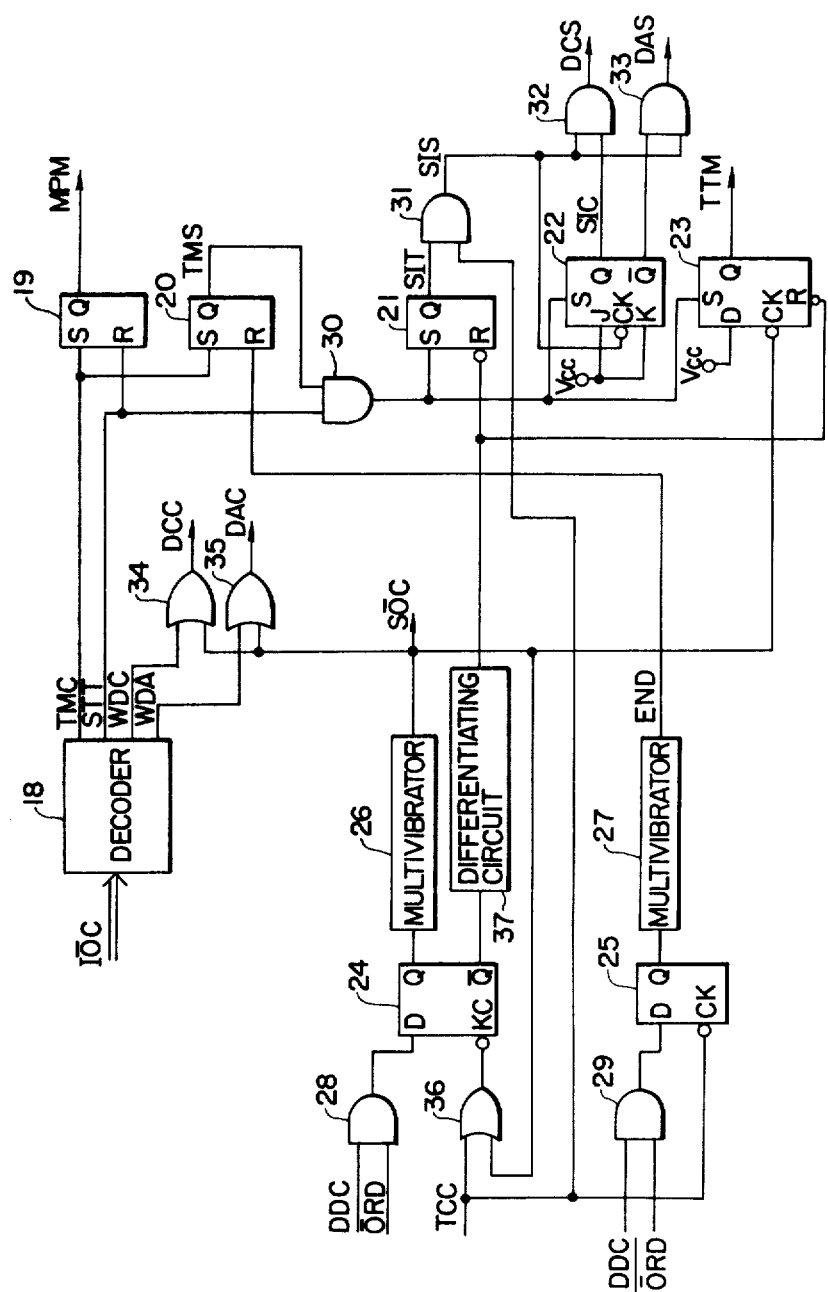

FIGS. 3 and 4 are block diagrams showing one embodiment of an interface circuit to be used in the data transfer system according to the present invention, FIG. 3 showing a data storing unit and FIG. 4 showing a control circuit.

In FIG. 3 numeral 11 indicates a down counter; 12 an up counter; 13 and 14 multiplexers; 15 and 16 first-in/first-out memories (which will be shortly referred to as "FIFO" memories); and 17 a gate circuit. Moreover, the designation IDT represents the data fed from the processor 1 or the main memory 2 through the data bus 6 to the multiplexers 13 and 14 and the memories 15 and 16; TCC clocks the transfer data count fed to the counters 11 and 12 through the data bus 6; MPM represents a multiplexer mode switching signal; DAC and DCC represent write-in clocks for transfer of the first address and the number of blocks of data to counters 11 and 12, respectively; DAS and DCS represent shift-in clocks for shifting of the first address and the number of blocks of data information stored in the memories 16 and 15, respectively; SOC represents a shift-out clock; TTM represents a data transfer timing signal; DDC represents a counter condition signal indicative of the fact that the content of the counter 11 is at "0" level; ORD represents a memory condition signal indicative of whether or not any data is stored in the memory 16; and OMA represents a memory address to be transferred to the main memory 2. The FIFO memories 15 and 16 may be provided in the form of read-out/write-in memories, such as a RAM or register file.

In FIG. 4, on the other hand, numeral 18 indicates a decoder; 19 to 21 designate S-R type flip-flops; 22 designates a J-K type flip-flop; 23 to 25 designate D type flip-flops; 26 and 27 designate monostable multivibrators; 28 to 33 designate AND gates; 34 to 36 designate OR gates; and 37 designates a differentiating circuit. Moreover, the designation IOC represents an instruction to the input/output device from the processor 1; TMC represents a transfer mode command; STT represents a start command; WDC represents a write-in command of the first address of the table; WDA represents a write-in command for the number of blocks of data of the table; TMS represents a transfer mode signal; SIT represents a timing signal for shift-in; SIC represents a timing signal for switching shift-in; SIS represents a shift-in signal; and END represents an end signal.

Figure 5:
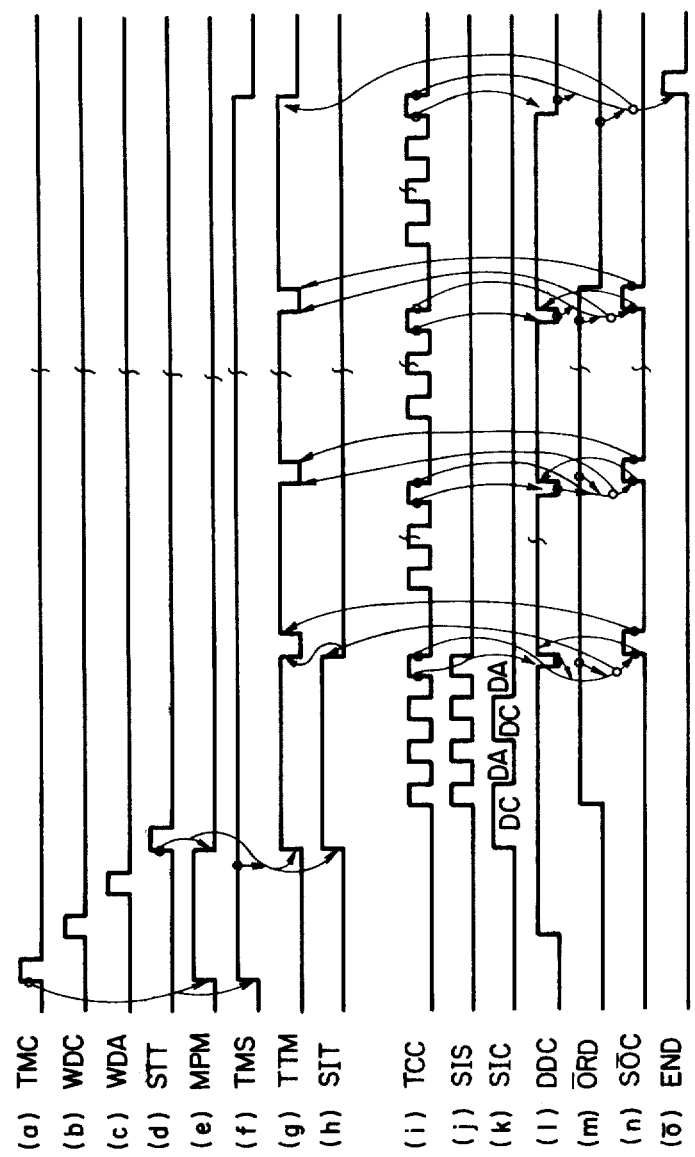
FIGS. 5a to 5o comprise a time chart showing the signals of the respective elements shown in FIGS. 3 and 4.

FIG. 5 is a time chart showing the signals of the respective elements shown in FIGS. 3 and 4. The designations appearing in FIG. 5 correspond to the same designations as appear in FIGS. 3 and 4.

The operations of the circuit shown in FIGS. 3 and 4 will now be described in detail with reference to the time chart shown in FIG. 5. The control signals provided by the processor are available in the known computer system, such as described in the afore-mentioned publication by Digital Equipment Corporation.

In FIG. 4 the instructions IOC to the input/output device are fed from the processor to the decoder 18 to begin the data transfer operation in accordance with this invention. First of all, the transfer mode command TMC illustrated in FIG. 5(a) is generated by the decoder 18 to bring the flip-flops 19 and 20 into their set conditions so that the multiplexer mode switching signal MPM and the transfer mode signal TMS are switched to the level "1". As illustrated in FIGS. 5(e) and 5(f), the signal MPM will be maintained only during the time instructions IOC are being decoded, while the signal TMS lasts for the entire data transfer operation.

At the second decoding step of the instruction IOC, the write-in command WDC illustrated in FIG. 5(b) is generated by the decoder 18 so that the write-in clock signal DCC is generated through the OR gate 34 and is applied to the down counter 11, enabling this counter to be preset in accordance with data supplied on bus 6 via multiplexer 13, which is enabled by the signal MPM.

At the third decoding step of the instruction IOC, the write-in command WDA illustrated in FIG. 5(c) is generated by the decoder 18 so that the write-in clock signal DAC is generated through the OR gate 35 and is applied to the up counter 12, enabling this counter to be preset in the address supplied on bus 6 via multiplexer 14, which is still enabled by signal MPM.

Those write-in clock signals DCC and DAC are fed to the down and up counters 11 and 12, respectively, of FIG. 3 so that the data IDT fed out of the processor 1, i.e., the first address TA and the number of blocks of data TC stored in the table SR are preset in the counters 11 and 12 through the multiplexers 13 and 14, in response to the multiplexer mode switching signals MPM. Thus, at this stage of the operation the counter 11 may be preset to the address at which values DA1 and DC1 are stored and the counter 12 may be preset to a value n equal to the number of blocks of data in table SR, as seen in FIG. 2.

When the start command STT illustrated in FIG. 5(d) is generated by the decoder 18 as the final decoding step of the instruction IOC, the flip-flop 19 is reset so that the multiplexer mode switching signal MPM disappears. Since, at this time, the transfer mode signal TMS generated by flip-flop 20 is maintained at the "1" level, the AND gate 30 will be enabled by the start command STT to bring the flip-flops 21 to 23 into their set conditions so that the timing signal for shift-in SIT, the timing signal for switching shift-in SIC and the data transfer timing signal TTM take the "1" level, as illustrated in FIGS. 5(h), 5(k) and 5(g).

In response to the timing signal for shift-in SIT, the AND gate 31 is opened so that the clock signal for the transfer of the data count TCC (illustrated in FIG. 5(i)) fed out of the processor is generated as the signal for shift-in SIS (illustrated in FIG. 5(j)). After having been set by the output of the AND gate 30, the J-K type flip-flop 22 is repeatedly set and reset in response to each of the signals for shift-in SIS to generate the timing signal for switching shift-in SIC. As a result, the AND gates 32 and 33 are alternately opened, and they generate the shift-in signals DCS for enabling the memory 15 to receive the data from bus 6 representing the number of lines of data in each block and the shift-in signals DAS for enabling the memory 16 to receive data from bus 6 representing the first address of a given block, respectively. These shift-in signals DCS and DAS are fed alternately to the FIFO memories 15 and 16, and permit memory 15 to successively store the values DC1-DCn and the memory 16 to store the starting addresses DA1-DAn (FIG. 2) in the manner to be described hereinafter.

In response to the data transfer timing signal TTM, which is generated by flip-flop 23, the first address TA of the table SR, which is stored in the up counter 12, is fed as the memory address signal OMA to the main memory 2 through the gate 17 so that the contents of the table SR, which are stored at the address TA in the main memory, i.e., DC1 and DA1, are read out and stored successively in the FIFO memories 15 and 16 in response to the successive generation of write-in clock signals DCS and DAS. When the clock for transfer of the data count TCC is received by the counters 11 and 12, the content of the up counter 12 is increased by one, and the count thus increased is fed as the next address to the main memory. A similar read-out of the next entry in table SR is performed so that the data read out, i.e., DC2 and DA2, is stored successively in the FIFO memories 15 and 16.

Simultaneously with receipt of the signal TCC by the counters 11 and 12, the content of the down counter 11 is counted down, thereby maintaining a count of the number of lines in table SR still to be read out and stored in the memories 15 and 16. As these operations are repeated, the content of the down counter 11 is sucessively decremented toward the "0" level; and, when the count reaches the zero level, the counter condition signal DCC, as illustrated in FIG. 5(l), is generated. Since, at this time, the memory condition signal ORD indicative of whether or not any data exists in the FIFO memory 16 is at the "1" level, the output of the AND gate 28 takes the "1" level so that it and the inverted signals of the clock for transfer of the data count TCC generate the shift-out clock signal SOC, as illustrated in FIG. 5(n), in cooperation with the OR gate 36, the D type flip-flop 24 and the monostable multivibrator 26. Simultaneously with this, the inverted output Ω of the flip-flop 24 is fed to the differentiating circuit 37 so that pulses at the "0" level are generated at the break thereof. By these pulses, the flip-flops 21 and 23 are reset so that the timing signal for shift-in SIT and the data transfer timing signal TTM are switched to the "0" level, as illustrated in FIGS. 5(h) and 5(g).

Then, in response to the break of the shift-out clock SOC, the flip-flop 23 is set to bring the data transfer timing signal TTM again to its "1" condition. When the shift-out clock SOC is generated and fed through the OR gates 34 and 35 to the counters 11 and 12, the outputs of the FIFO memories 15 and 16 are stored in the counters 11 and 12. Moreover, the shift-out clocks SOC are impressed upon the FIFO memories 15 and 16, and the contents of the FIFO memories 15 and 16 are shifted in accordance with the principles of the FIFO or first-in/first-out operations so that the subsequent new outputs of the FIFO memories are prepared for the multiplexers 13 and 14. Then, the first address (DA1) stored in the counter 12 is transferred to the main memory in response to the data transfer timing signal TTM so that the content of the corresponding address of the main memory is read out to the input/output device. In response to the clock for transfer of the data count TCC fed to the counters 11 and 12, the content of the counter 12 is counted up and is transferred in a similar manner to the above until the count in counter 11 is decremented to zero so that the data transfer in accordance with the DMA mode is effected.

If, in this way, the data in one address area is read out so that the content of the counter 11 is reduced to zero, the shift-out clock SOC is generated, as has been described in the above, and the number of lines of data in the next block and the first address of the next block, which are stored in the FIFO memories 15 and 16, are transferred to the counters 11 and 12, so that similar operations to the above are accomplished. After all the blocks of data have been transferred from the memory, the amount of data in the FIFO memory 16 will be zero, and the memory condition signal ORD, as illustrated in FIG. 5(m), will be at the "0" level. Since, moreover, the counter condition signal DDC is at the "1" level, the output of the AND gate 29 is switched to the "1" level so that the end signal END, as illustrated in FIG. 5(o), is generated by the operations of the clock for transfer of the data count TCC, the flip-flop 25 and the monostable multivibrator 37 to reset the flip-flop 20 thereby to bring the transfer mode signals TMS into their "0" condition.

Although, in the embodiment thus-far described, the present invention is applied to the case in which the control circuit for the data transfer is provided in the interface circuit unit, the invention is not limited to such application, but can be extended to the construction in which the data transfer control circuit is provided in the input/output controller or another special device.

The present invention should not be limited to the construction having only one input/output device, but can also be extended to the construction having a plurality of input/output devices.

On the other hand, the data transferred from the main memory to the input/output device may be fed as it is to the input/output device or it may be temporarily stored in an auxiliary memory. In the latter case, moreover, the data may be stored in either adjacent or separate areas of addresses of the auxiliary memory.

Moreover, the present invention can be similarly applied to the case in which the data of the plural adjacent areas of addresses is transferred to the plural areas of continuous addresses of the auxiliary memory of the input/output device.

Still moreover, the present invention can be applied not only to an image displaying device but also to an ordinal graphic display or various editing devices.

As has been described hereinbefore, the present invention can enjoy an advantage that, since the content of the table is automatically transferred from the main memory at a high speed if only the first address and the number of block data of the table indicative of the plural areas of addresses are fed from the processor to the input/output device, the time required for the data transfer can be remarkably shortened and the number of the data to be transferred can be remarkably increased.

While we have shown and described one exemplary embodiment in accordance with the present invention, it is to be understood that the same is not limited thereto but is susceptible of numerous changes and modifications as are obvious to those of ordinary skill in the art, and we therefore do not wish to be limited to the details shown and described herein but intend to cover all such changes and modifications as are obvious to those skilled in the art.

What is claimed is:

1. A data transfer method for use in a data processing system including a processor, a main memory and at least one input/output device capable of operating in the direct memory access mode to effect direct data transfer from separate storage areas of continuous addresses in said main memory to said input/output device, comprising the steps of:

storing the starting address and the number of continuous addresses of each of said separate storage areas of said main memory from which data is to be transferred in the form of a table having a number of data groups equal to the number of separate storage areas, including transferring to said input/output device the starting address of said table in the main memory and the number of data groups therein, feeding the starting address of said table to said main memory from said input/output device to effect direct data transfer therefrom in accordance with the direct memory access mode, incrementing said starting address of said table at said input/output device in accordance with the number of data groups therein, forwarding the incremented addresses from said input/output device to said main memory for direct memory access mode transfer therefrom, and storing the data transferred from said table in said input/output device;

feeding in succession the starting address of each separate storage area to said main memory from said input/output device to effect direct data transfer therefrom in accordance with the direct memory access mode;

incrementing each starting address at said input/output device in accordance with the stored number of continuous addresses associated with said starting address; and forwarding said incremented addresses to said main memory for direct memory access mode transfer of data prior to forwarding the next starting address to said main memory.

2. A data transfer method for use in a data processing system including a processor, a main memory and at least one input/output device capable of operating in the direct memory access mode to effect direct data transfer between said main memory and said input/output device, comprising the steps of: presetting in a table in said main memory, for each of a plurality of groups of data to be transferred, the first address and the number of data items to be transferred from each of a plurality of areas of continuous addresses in said main memory; feeding the starting address of said table and the number of first addresses in said table stored in the main memory out of said processor to said input/output device by means of the program control in accordance with said direct memory access mode; transferring the corresponding content of said table to said input/output device from said main memory in accordance with the data fed out of said processor; and effecting direct transfer of data between said main memory and said input/output device in accordance with the transferred content of said table.

3. A data transfer method for use in a data processing system including a processor, a main memory and at least one input/output device capable of operating in the direct memory access mode to effect the direct data transfer between said main memory and said input/output device, comprising the steps of: presetting in a table in said main memory an identification of each of a plurality of non-contiguous areas of continuous addresses in said main memory from which data is to be transferred; feeding data indicative of the location and size of said table in said main memory out of said processor to said input/output device in accordance with said direct memory access mode; transferring the corresponding content of said table to said input/output device from said main memory in accordance with the data fed out of said processor; and effecting the direct transfer of data between said main memory and said input/output device in accordance with the transferred content of said table.

4. In a data processing system including a processor, a main memory connected to said processor, connection means for carrying data signals, and at least one input/output device for operating in the direct memory access mode to effect direct data transfer between said main memory and said input/output device via said connection means, said input/output device including first and second memories connected to said connection means for respectively receiving and storing the first address and the number of items of data to be transferred from each of a plurality of areas of continuous addresses in said main memory; first and second counters; means for successively presetting said first and second counters to initial values representing said first address and said number of items of data to be transferred from each of a plurality of areas of continuous addresses in said main memory, respectively, as stored in said first and second memories; means for feeding the content of said first counter to said main memory to effect direct data transfer therefrom; and control means for successively incrementing said first counter and decrementing said second counter until said second counter reaches a zero stage subsequent to each presetting of said first and second counters.

5. A data processing system according to claim 4, in which the data representing said first addresses and the number of items of data to be transferred in association with each first address are stored in a selected area of said main memory, and further including initiating means for actuating said presetting means to preset said first and second counters to the starting address of said selected area and the number of first addresses stored therein, respectively, to effect transfer of the data in said selected area of said main memory to said first and second memories.

6. A data processing system according to claim 5, wherein said initiating means includes decoder means responsive to an instruction signal from said processor for connecting said presetting means to said processor.

7. A data processing system according to claim 6, wherein said control means includes means for detecting the zero state of said second counter and transfer control means responsive to said detecting means for effecting transfer of a first address and data item number from said first and second memories to said first and second counters via said presetting means.

8. A data processing system according to claim 4, wherein said first and second memories are first-in/first-out memories.

9. A data processing system capable of direct memory access transfer of data comprising a processor; a main memory having data stored in a plurality of first selected areas of continuous addresses and a table of identifying information relating to those first selected areas stored in a second selected area; at least one input/output device; and control means responsive to said processor for effecting direct access transfer of data from said main memory to said input/output device, said control means including counter means for storing identifying information relating to said first or second selected areas of said main memory, memory means for storing said table of identifying information relating to said first selected areas, means for feeding the identifying information stored in said counter means to said main memory to effect direct access transfer of data therefrom to said input/output device, first means responsive to said processor for presetting said counter means to the identifying information of said second selected area to effect transfer of said table to said memory means, and second means responsive to transfer of said table by said first means for successively feeding the data stored by said memory means to said counter means.

10. A data processing system according to claim 9, wherein the table of identifying information stored in said second selected area of said main memory includes a plurality of information items each including a starting address of a respective one of said first selected areas and the number of data items to be transferred therefrom.

11. A data processing system according to claim 10, wherein said memory means includes first and second memories for storing said starting addresses and said numbers of data items, respectively.

12. A data processing system according to claim 11, wherein said counter means includes first and second counters selectively connected to said first and second memories, respectively, and means for incrementing said first counter in accordance with the data stored in said second counter.

13. A data processing system according to claim 12, wherein said first counter is an up counter and said second counter is a down counter, and said counter means includes clock means for driving said first and second counters.

14. A data processing system according to claim 13, wherein said first means includes decoder means responsive to an instruction from said processor for presetting said counter means and detecting means for detecting a zero state of said second counter, said second means being responsive to said detecting means for effecting a shift out of data from said first and second memories to said first and second counters, respectively.

15. A data transfer method for use in a data processing system including a processor, a main memory and at least one input/output device capable of operating in the direct memory access mode to effect direct data transfer from separate storage areas of continuous addresses in said main memory to said input/output device, comprising the steps of: presetting in a table in said main memory, for each of a plurality of groups of data to be transferred, at least an address corresponding to the first address of each of said separate storage areas of said main memory from which data is to be transferred; feeding at least an address corresponding to the starting address of said table in the main memory out of said processor to said input/output device by means of the program control in accordance with said direct memory access mode; transferring the corresponding content of said table to said input/output device from said main memory in accordance with the data fed out of said processor; and effecting direct data transfer from separate storage areas of continuous addresses in said main memory to said input/ouput device in accordance with the transferred content of said table.

* * * * *